United States Patent [19]

Greenig et al.

[11] 4,441,126

[45] Apr. 3, 1984

[54] ADAPTIVE CORRECTOR OF FACET ERRORS IN MIRROR SCANNING SYSTEMS

[75] Inventors: Nelson L. Greenig, Norristown; John R. Taylor, North Wales; Richard S. Schwartz, Willow Grove, all of Pa.

[73] Assignee: Sperry Corporation, New York, N.Y.

[21] Appl. No.: 375,593

[22] Filed: May 6, 1982

[51] Int. Cl.³ ............................................. H04N 1/30
[52] U.S. Cl. .................................. 358/293; 358/206; 358/300
[58] Field of Search ................ 358/206, 293; 346/108; 350/6.8

[56] References Cited

U.S. PATENT DOCUMENTS

| | | | |
|---|---|---|---|
| 3,750,189 | 7/1973 | Fleischer | 346/74 ES |
| 3,835,249 | 9/1974 | Dattilo et al. | 178/7.6 |
| 3,898,580 | 8/1975 | Millsap | 331/15 |
| 3,938,182 | 2/1976 | McKenna | 360/26 |
| 4,000,368 | 12/1976 | Tisue | 358/264 |
| 4,002,829 | 1/1977 | Hutchison | 358/286 |
| 4,032,888 | 6/1977 | Broyles et al. | 340/146.3 F |
| 4,037,231 | 7/1977 | Broyles et al. | 346/108 |
| 4,044,363 | 8/1977 | Morgan | 354/5 |
| 4,195,316 | 3/1980 | Sansome | 358/293 |
| 4,404,596 | 9/1983 | Juergensen et al. | 358/293 |

FOREIGN PATENT DOCUMENTS 52-56944  5/1977  Japan ............................. 350/6.8

Primary Examiner—Howard W. Britton
Assistant Examiner—John K. Peng
Attorney, Agent, or Firm—James R. Bell; Marshall M. Truex

[57] ABSTRACT

A beam deflection system is provided with electrical circuitry for adaptively correcting the deflection of a beam of radiant energy in a scanning system incorporating a rotating scanning mirror to compensate for misalignment in facets of the mirror. With the use of an acousto-optic modulator providing a deflected beam at an angle dependent on the frequency of an acoustic drive signal, the orientation of the beam can be altered to compensate for the misaligned facets by varying the acoustic frequency. A sensor and bridge circuit signal the position of a beam scan. A memory stores the value of the frequency for scans by each facet, the value being altered with each scan to optimize the frequency. A drift compensation circuit provides for an averaging of the parameter values, and provides a voltage to adjust the balance of the bridge to drive the average value towards a reference value.

19 Claims, 9 Drawing Figures

FIG. 9.

COMPUTER SIMULATION OF FACET CORRECTION ALGORITHM

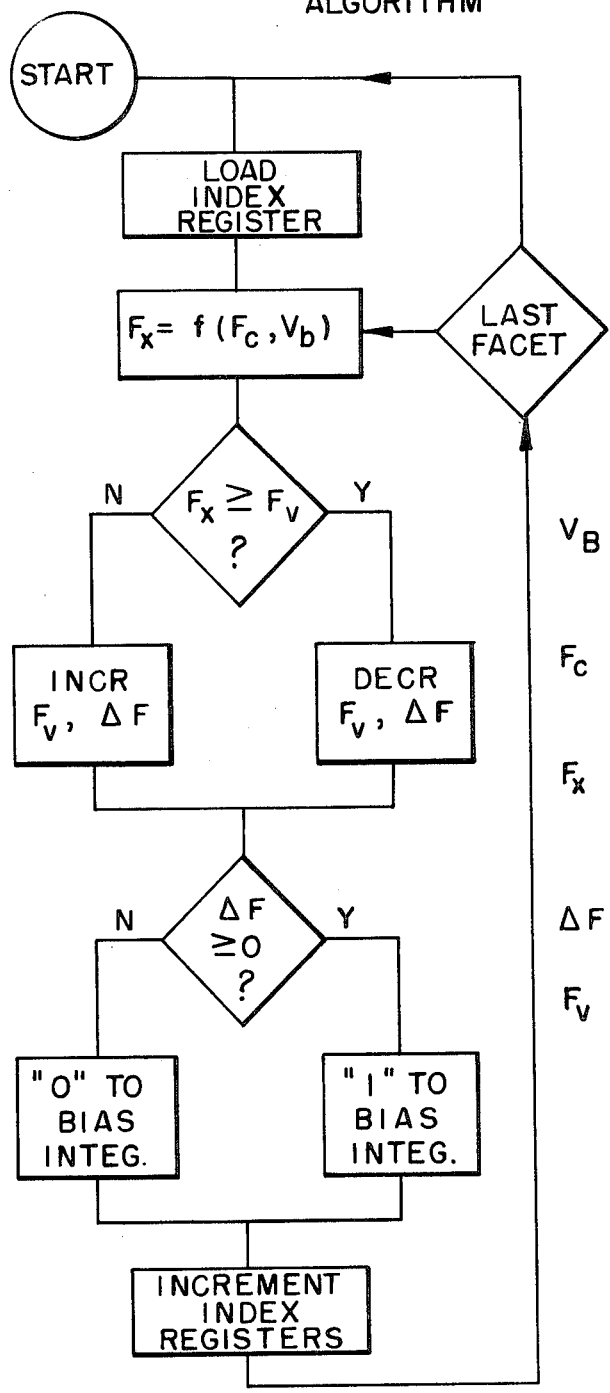

$V_B$ = Bias voltage (Range 0 to 2.5 volts) from integrator with digital input.

$F_C$ = Cross over frequency at $V_B$ = 1 volt.. Each facet has its own $F_C$ parameter.

$F_X$ = $F_C$ + 15 ($V_B$ − 1)
Function assumed for simulation program.
$F_X$ = f($F_C$, $V_B$) in general.

$\Delta F$ = Integer counter. Zeroed at start.

$F_V$ = FCO frequency. Start at desired mean frequency.

ial in the vertical orientation of a
ADAPTIVE CORRECTOR OF FACET ERRORS IN MIRROR SCANNING SYSTEMS

BACKGROUND OF THE INVENTION

1. Field of the Invention

This invention relates generally to photographic recorders of the ray type and more particularly to mirror scanning systems compensating for various orientations of mirror facets by corresponding alterations in the direction of light rays emanating from an acousto-optic modulator.

2. Description of the Prior Art

Optical scanning systems are utilized in a variety of situations including non-impact printers and facsimile devices. Typically, such systems employ a multi-faceted mirror which is rotated about a stationary axis to provide for a scanning of a light beam within a plane, usually the horizontal plane. For the imprinting of alphanumeric characters or other symbols on a recording medium, the medium may be formed of photo-sensitive material and positioned along the periphery of a drum. The axis of the drum lies in the scanning plane. The drum is rotated by a predetermined increment between successive scans so that each scan produces one line of printed material on the recording medium.

For modulating the intensity of the light beam so as to produce light and dark regions on the recording medium, many systems are now employing acousto-optic modulators wherein an interaction between an acoustic wave and a light wave results in a splitting off of a portion of the optical energy from the main beam, or zero order beam, into a diffracted, or first order beam. The scanning mirror and the drum are positioned to intercept the diffracted beam. Thus, by activating and deactivating the acoustic wave, the diffracted beam is amplitude modulated.

In the use of the foregoing modulators, the angle of diffraction, or Bragg angle, is dependent on the frequency of the acoustic wave and on the speed of propagation in the medium of the modulator as these two parameters determine the wavelength of the acoustic wave. Such frequencies are on the order of radio frequencies, RF, and may approach 100 MHz (megahertz). Accordingly, in the construction of such scanning systems, the locating of the optical components is dependent on the selection of the acoustic frequency and the Bragg angle so that the diffracted beam will be intercepted by the scanning mirror and reflected to the site of the scan line on the recording medium.

A limitation arises in the construction of such systems in that great precision is required to insure that a succession of scan lines will appear to be uniformly presented on the recording medium, and, in particular, that the scan lines will be evenly spaced. However, due to the geometry of the optical paths and the optical elements, a slight misalignment in the vertical orientation of a mirror facet relative to a second facet results in a noticeable variance in the spacing between lines of printed matter on the recording medium. Accordingly, it has been necessary to maintain high tolerance on the manufacture of the scanning mirror. It would be most advantageous if the scanning system would be less dependent on the precision of the manufacture of the scanning mirror for increased accuracy in the spacing of scan lines even in the presence of discrepancies in the orientations of the mirror facets.

This limitation is compounded by considerations which become apparent during an attempt to build the scanning system with features which might compensate for discrepancies in the facet orientations. For example, the use of fixed compensation, established individually for each mirror facet as by perturbations in the beam direction, requires a time consuming alignment process. Also, the use of an optical sensor for an automatic compensation for the facet errors introduces the considerations of electronic component drift which would introduce much greater errors than those of the facet orientations.

The foregoing illustrates limitations of the known prior art. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

In one aspect of the present invention, this is accomplished by providing an apparatus for correcting facet errors in mirror scanning systems including a rotatable assembly of optical elements for scanning a beam in a plane. The beam is directed to the rotatable assembly by an acousto-optic modulator which modulates the beam with data and deflects the beam as a function of the frequency of an acoustic signal which drives the modulator. A sensor senses the position of the beam as directed by the rotatable assembly. A controller is responsive to signals of the sensor for controlling the frequency. The controller includes a memory for storing frequency values for scans by successive ones of the optical elements, and means for altering the frequency.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIGS. 8 and 9 illustrate, respectively, an algorithm and comparator simulation of the algorithm for a microprocessor to be used in an alternative embodiment of the controller of FIG. 4.

DESCRIPTION OF THE PREFERRED EMBODIMENT

The present invention is generally related to the optical sweeping system disclosed in the commonly-assigned U.S. Pat. No. 4,307,409 entitled, "Multi-Aperture Feedback System for a Laser Scanner", invented by Nelson L. Greenig & Richard M. Shelton, and issued on Dec. 22, 1981, which is expressly incorporated herein by reference.

Figure 1:
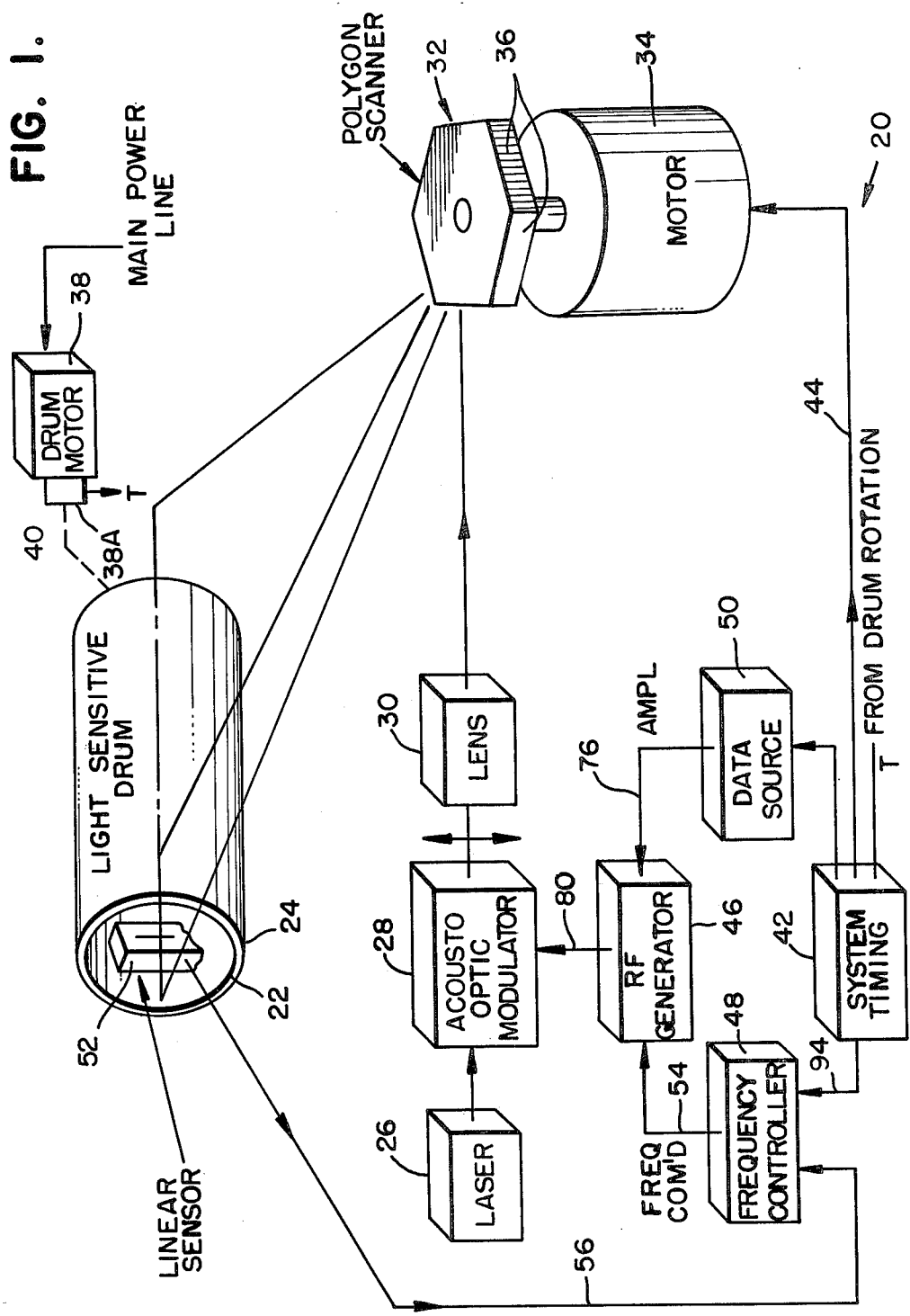
FIG. 1 is a diagrammatic view of a mirror scanning system incorporating an embodiment of the invention for correction of facet errors in the mirror.

Referring now to FIG. 1 there is shown a scanning system 20 incorporating a preferred embodiment of the present invention. The system 20 includes a drum 22 supporting a recording medium 24 of photosensitive material which is illuminated by the light of a laser 26 for the printing of data, such as alphanumeric characters or other symbols, upon the medium 24. The system 20 includes an acousto-optic modulator 28, focusing optics shown as a lens 30, which is typically a multi-element lens, and a multi-faceted mirror 32 which is rotated by a motor 34 for scanning a beam of the laser light upon the medium 24. Each mirror facet 36 provides a separate scan line upon the medium 24.

During the generation of each scan line of printed matter upon the medium 24, the drum 22 is advanced by an incremental amount of rotation designed by a motor 38, shown mechanically coupled to the drum 22 by dashed line 40. Synchronization of the rotations of the motors 34 to 38 is provided by a system timing unit 42. Timing for the mirror motor 34 is provided by signals conducted along line 44 from the timing unit 42. Synchronization signals from a shaft angle encoder 38A of the drum motor 38 are coupled to the timing unit 42 by a terminal T for synchronizing the timing unit 42 with rotations of the drum 22. Accordingly, the drum motor 38 may be energized directly from an electric power line.

The system 20 further comprises an RF (radio frequency) generator 46, a frequency controller 48, a data source 50 and a linear sensor 52 of the laser light. The output RF signal of the generator 46 is coupled to a transducer within the modulator 28 to provide an acoustic wave at a radio frequency for driving the acousto-optic modulator 28. The amplitude of the RF signal and, hence, of the acoustic wave is modulated by the data source 50, a corresponding modulation appearing on the light ray incident upon the recording medium 24. The frequency of the RF signal or electric wave and, hence, the acoustic wave, is established in response to a frequency command signal from the controller 48, the command signal being digitally formatted and coupled by a data bus 54.

The sensor 52 is positioned alongside the drum 22 where the scan begins and is oriented to the scanning plane of the mirror 32 so as to intercept the beginning of a scan line. The sensor 52 provides electrical signals, in a manner to be described hereinafter, which signal the location of a scan line to indicate whether the scan line is too high or too low. The electrical signals are coupled by a line 56 to the frequency controller 48 whereby the controller 48 can order a change in the frequency of the scan lines.

Figure 2:
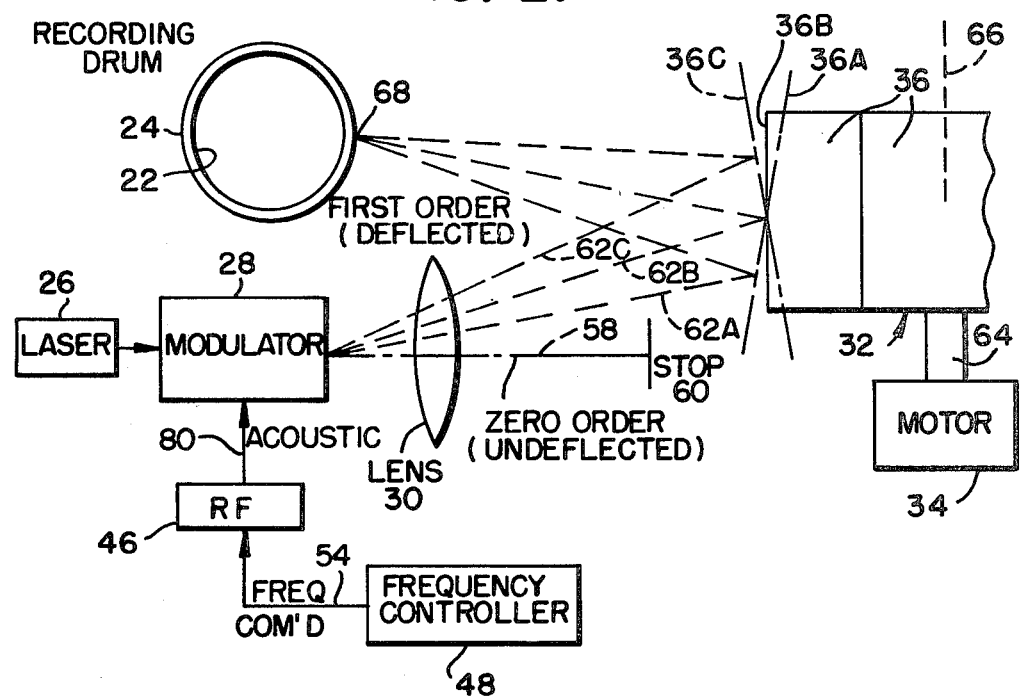
FIG. 2 shows a portion of the system of FIG. 1 including an elevation view of the mirror with a schematic presentation of light rays for different orientations of a mirror facet in the vertical plane.

Referring also to FIG. 2, the effect of the acoustic-drive signals within the modulator 28 is more readily seen. In the absence of the acoustic-drive signal, the light of the laser 26 is undeflected as it passes through the modulator 28 and the lens 30 to provide the zero-order or undeflected beam 58 shown incident upon an exemplary stop 60. In the presence of the acoustic wave, a portion of the radiant energy of the beam 58 is deflected as a first-order or deflected beam 62. An exemplary three such deflected beams are shown in FIG. 2 and are further identified by the legend A, B, and C to illustrate specific ones of these beams 62. The angle of the deflection is dependent upon the frequency of the acoustic wave so that, by varying the frequency in a known manner, either one of the deflected beams 62A, 62B or 62C can be obtained.

In the instant system 20, only the deflected beams 62 are to be utilized in producing a scan line upon the recording medium 24. Since the undeflected beam 58 is not utilized, the stop 60 absorbs the energy thereof. Alternatively, as is done in other scanning systems (not shown), the energy of the beam 58 may be utilized to measure the instant scan angle, as by allowing the beam 58 to impinge upon a portion of the scanning mirror 32.

As best seen in FIG. 2, the orientation of the mirror 32 is precisely set with reference to the motor shaft 64, suitable bearing and supporting structure (not shown) being attached thereto to insure the precise orientation of the mirror 32 relative to the modulator 28 and the drum 22 for the precise positioning of the scan line. Nevertheless, slight perturbations in the location of the scan line may occur due to small variations in the orientations of respective ones of mirror facets 36 with respect to the central axis 66 of the scanning mirror 32. The dashed lines 36A and 36C represent two possible deviant orientations of a mirror facet 36B. Three deflected beams 62A–C are provided with the requisite angles of deflection for impinging, respectively, on the mirror surfaces represented by the three lines 36A–C for further reflection towards the drum 22 to impinge upon a common scan line at 68. Thus, for each perturbation in the alignment of the set of mirror facets 36, there is some angle of deflection of first order beam 62 which can compensate for the misalignment in each facet 36 to insure that the beams 62 are reflected by the mirror 32 to the proper location at the drum 68.

Since, as has been noted hereinabove, such angle of deflection of the beam 62 is dependent on the frequency of the acoustic wave within the modulator 28 by the generator 46, misalignments of the mirror facets 36 are compensated by the selection of the appropriate frequency command signal on bus 54 for establishing the requisite frequency and wavelength to the acoustic wave. The foregoing procedure in the compensation is applicable for laser light both within the visible spectrum as well as outside of the visible spectrum. The beam of radiant energy produced by the laser 26 is defracted in accordance with a phenomenon of Bragg defraction in the medium of the modulator 28 in the presence of the acoustic wave.

Figure 3:
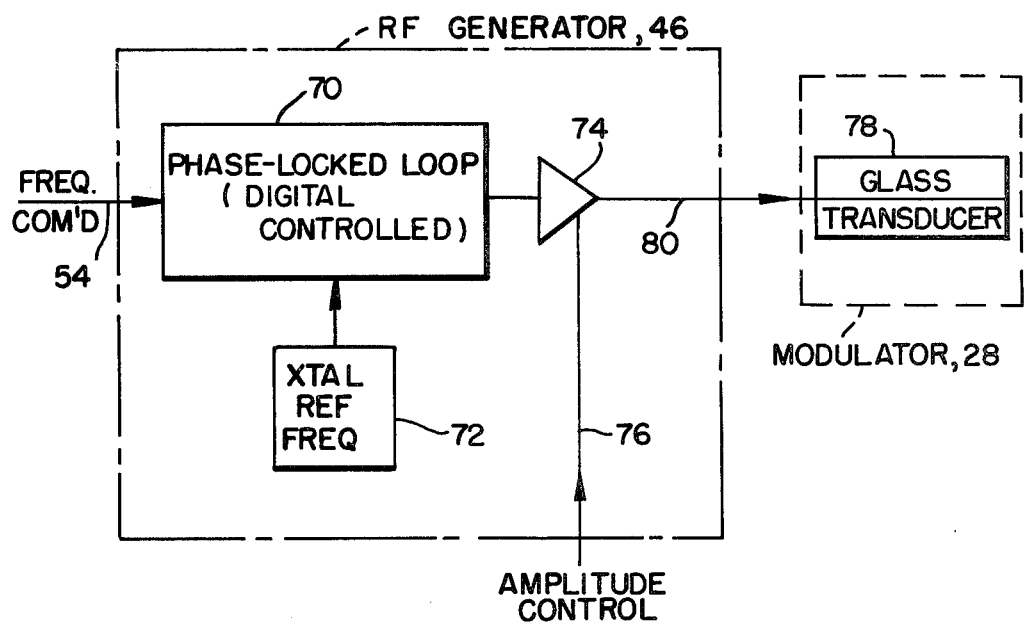
FIG. 3 is a block diagram of an acoustic generator in the system of FIG. 1.

Referring now to FIG. 3, the R.F. generator 46, previously seen in FIG. 1, comprises a phase-locked loop 70, a crystal-controlled source 72 of a reference frequency for use by the phase-locked loop 70, and an amplifier 74 having a gate signal terminal connecting with line 76. A transducer 78 for converting electrical energy into sonic energy is located in modulator 28. The phase-locked loop 70 includes a digital frequency synthesizer responsive to a digitally-formatted frequency command signal on bus 54 for providing a sinusoidal electrical signal having a frequency equal to that of the desired acoustic signal. Digitally-controlled frequency synthesizers are well known and available commercially and, accordingly, such circuitry is readily implemented within the phase-locked loop 70.

The sinusoidal signal produced by the phase-locked loop 70 is amplified by the amplifier 74 to a suitable power level for driving the transducer 78. In response to the signal on line 76 from the data source 50 (FIG. 1), the amplifier 74 may be placed in a state of conduction or non-conduction to the passage of the signal from the loop 70 to the transducer 78. Thereby, in response to the signal on line 76, the acoustic wave and the resultant deflected beam 62 (FIG. 2) may be established or discontinued to provide, respectively, a light or dark area on the recording medium 24 upon the drum 2. The coupling of the R.F. Drive signal from the amplifier 74 to the modulator 28 is provided by line 80. The successive bursts of the drive signal on line 80 may be either of the same frequency or of different frequencies depending on the value of the frequency command signal on bus 54.

Figure 4:
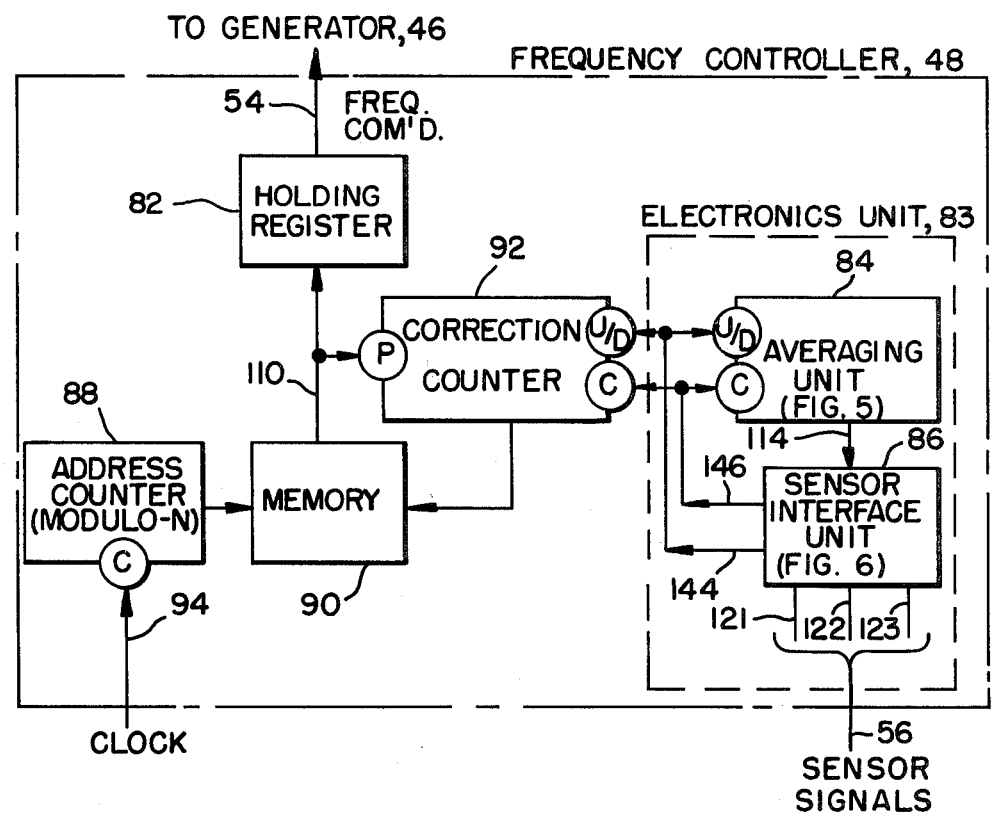
FIG. 4 is a block diagram of a frequency controller of the system of FIG. 1, a variation in the frequency altering the vertical orientation of a light ray in accordance with the invention.

Referring now to FIG. 4, the frequency controller 48 comprises a holding register 82, an electronics unit 83 comprising an averaging unit 84 and a sensor-interface unit 86, an address counter 88, a memory 90, and a counter 92 for correction of the frequency command words stored in the memory 90. The memory 90 stores the value of the frequency of the R.F. drive signal for the modulator 28 (FIG. 1), the values of the frequency being represented by digitally-formatted command words or numbers. The memory 90 is addressed by the counter 88, the counter 88 counting clock signals applied by the timing unit 42 (FIG. 1) via line 94 to the clock-input terminal, C, of the counter 88. A clock signal on line 94 appears at the completion of each scan line so as to ready the controller 48 for the next scan line. In this embodiment, there are 15 facets on the polygon mirror 32. There are also 15 counts within counter 88, the counter 88 counting modulo-N where N=15 is the number of facets. Therefore, after each revolution of the mirror, the counter 88 returns to its original state. Prior to the generation of each scan line, the requisite frequency command word is loaded from the memory 90 into the register 82 and held within the register 82 during the scan so as to provide for the required frequency of the acoustic-drive signal throughout the generation of the scan line.

In accordance with a feature of the invention, the digitally-formatted frequency command is represented as a number, and is parallel loaded into the counter 92 at P to preset the counter 92, acting through the interface unit 86, transmits a signal which either increments or decrements the count of the counter 92 to increment or decrement the count is based on the sensed position of a scan line relative to a reference value of position. Thus, the counter 92 continues to increment this count during subsequent scans by an individual one of the mirror facets 36 as long as the scan line is sensed as being to one side of the reference location, the counter 92 thereafter decrementing when the sensed position of the scan line is on the opposite side of the reference location.

The signal commanding the incrementing (counting up) or decrementing (counting down) is applied by the interface unit 86 to the up/down, U/D, terminal of the counter 92. A signal indicating that a terminus of a scanning beam has been detected by the sensor 86 is applied to the clock terminal, C, of the counter 92 to alter the count by the value of one. The updated, or corrected, value of the frequency command, as stored in the counter 92, is then loaded into memory 90 in place of the previous value of the command word. Thereby, the value of the frequency command time is steadily altered from revolution to revolution of the scan mirror 32 to optimize the value of the frequency and wavelength of the acoustic wave in the modulator 28. Once the reference position of the scan line has been attained, the counter 92 oscillates about the desired value of the command word by an amount no greater than unity, the magnitude of the oscillation being sufficiently small relative to the magnitude of the number representing the command word so as to introduce no more than a negligible error in the angle of deflection of the scanned beam. The unit 84 provides a correction signal to the interface unit 86 for compensation of component defects in accordance with a further feature of the invention as will now be described.

Figure 5:
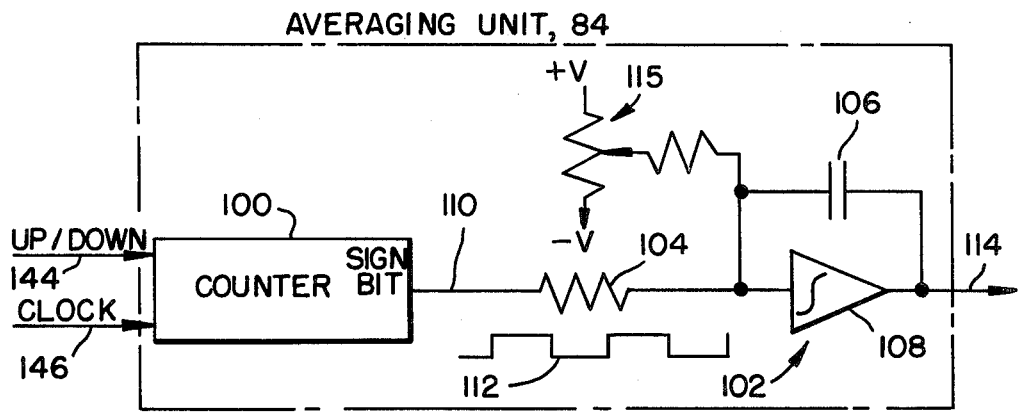
FIG. 5 is a block diagram of an averaging unit in FIG. 4.

Referring now to FIG. 5, the averaging unit 84 comprises a counter 100 and an integrator 102, the integrator 102 including a resistor 104, a capacitor 106 and an operational amplifier 108. The capacitor 106 connects the output terminal of the amplifier 108 with a summing point at the junction of the resistor 104 and the negative (or inverting) input terminal of the amplifier 108 to provide the well-known integrator circuit. With respect to the output terminal of the counter 100, only the sign bit thereof is utilized, the sign bit being coupled via the resistor 104 to the amplifier 108. Thus, the signal at the output terminal of the counter 100, on line 110, has the appearance of a pulse-width modulated signal, as portrayed in the exemplary waveform 112, and having a duty factor dependent on the magnitude of component drift, as will be described below. The signal on line 110 is then integrated by the integrator 102 to provide the correction signal on line 114 for the interface unit 86. The correction signal on line 114 has a substantially constant (or slowly varying) amplitude depending on the duty factor of the waveform 112.

In operation, the counter 100 counts clock pulses, the counting being up or down dependent on an up/down command signal provided by the interface unit 86. The counter 100 is preloaded with zero at the same time that the facet parameter locations in the memory 90 are preloaded with the parameters for the desired average frequency. A well-known bias circuit 115 is coupled to the input terminal of the amplifier 108 to offset the voltage of the sign bit so that, for a waveform 112 having equal durations of the logic 1 and logic 0 states, the integrator 102 provides a value of zero at its output termination line 114. The time constant of the resistor-capacitor circuit of the integrator 102 is much longer than the period of rotation of the scan mirror 32 to insure accurate integration of the successive counts of the counter 100.

Thereby, the averaging unit 84 produces the signal on line 114 with an amplitude proportional to the average value of the command words. In the event that the average value of the command words becomes excessively large or excessively small, this indicating a drifting in the parameter value of the components in the interface unit 86 and the sensor 52, the duty cycle of the square-wave signal on line 114 serves as a correction signal for altering the values of certain components in the interface unit 86, as will now be described, to compensate for the foregoing drift.

Figure 6:
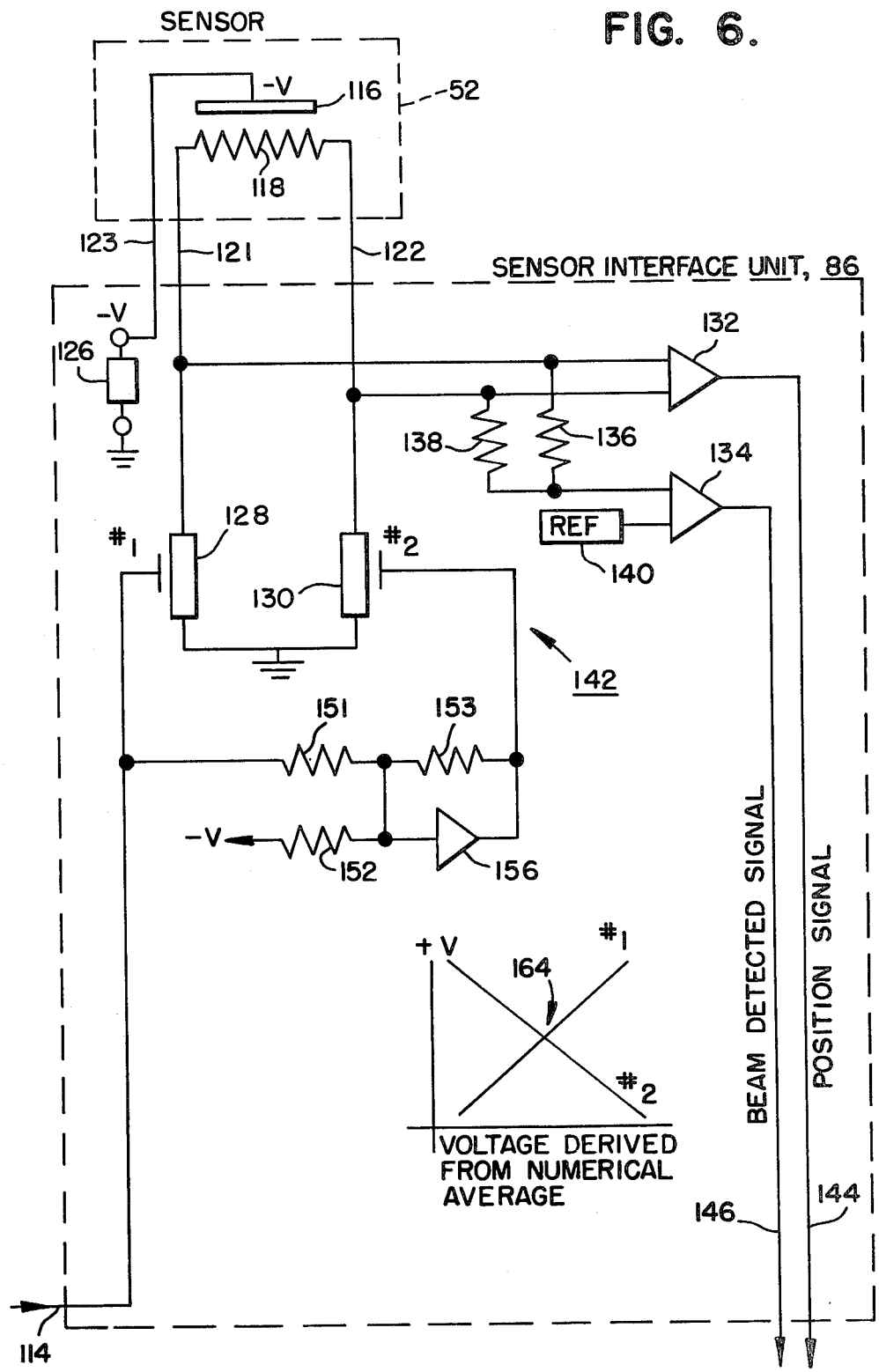
FIG. 6 is a diagram, partially schematic, of electrical circuitry of a sensor interface in the controller of FIG. 4.

Referring now to FIG. 6, the diagram shows the electric circuitry of the sensor 52, the interface unit 86 and their interconnection. The sensor 52 comprises a first electrode 116 and a second electrode in the form of a resistive element 118, both of which are imbedded in photosensitive material. In the presence of electrical excitation and incident light, electric current flows between the terminal 116 and the element 118. The element 118 terminates in lines 121 and 122, the current of the sensor 52 dividing between the two lines 121-122 in accordance with the location of impact of the light beam 62 (FIG. 1) upon the sensor 52.

Voltage excitation, −V, to the plate 116 is applied via line 123 from a power supply 126. The lines 121-123 are included within the lines 56 (FIG. 1) connecting the sensor 52 with the frequency controller 48. However, the interface unit 86 includes two field-effect transistors 128 and 130 and comparators 132 and 134, resistors 136 and 138 and a source 140 of a reference voltage for the comparator 134.

The source 130 may be readily fabricated by a resistive divider network (not shown) connected across the terminals of the supply 126. Each of the transistors 128 and 130 are utilized as resistive elements in arms of a bridge circuit 142, their remaining two arms being formed by the two portions of the element 118 through which the sensor current divides. The lines 121 and 122 connect with the input terminals of the comparator 132 which senses a null in the bridge circuit 142. A comparator 132 is responsive to the polarity between the lines 121 and 122 for providing an output logic signal having a high or low logic level corresponding to a logic 1 or 0.

On line 144, depending on the location of the point of impingement of the light beam 62 upon the sensor 52, the signal on line 144 is applied, as shown in FIG. 4, to the up/down terminal of the counter 92. The magnitudes of the voltages on the lines 121 and 122, with reference to ground, are summed together by the summing resistors 136 and 138, the sum being applied to the input terminal of the comparator 134. In the absence of the optic signal of the light beam 62, the magnitude of the sum signal presented by the resistors 136 and 138 is less than the magnitude of the reference voltage of the source 140. In the presence of the optical signal, the magnitude of the sum signal is greater than the magnitude of the reference voltage. A logic level of the output signal of the comparator 134 on line 146 is, thus, responsive to the presence or absence of the light beam 62, the signal on line 146 being coupled, as shown in FIG. 4, to the clock terminal of the counter 92.

In accordance with a further feature of the invention, an interface unit 86 includes further circuitry for the compensation of drift in the parameter values of the components of the bridge circuit 142. The circuitry of the interface unit 86 further comprises four resistors 151, 152 and 153 and an amplifier 156. The amplifier 156 is an inverting amplifier and the resistor 153 is coupled between the input and output terminals of the amplifier 156 to establish a predetermined gain thereto. The resistors 151-152 serve as summing resistors for combining the correction signal on line 114 with a fixed bias at the input terminal of the amplifier 156. The fixed bias is obtained by virtue of the connection of the resistor 152 to the power supply 126, the two resistors 151-152 serving as a voltage divider of the bias signal.

In operation, the resistance of the transistors 128 and 130 in combination with the resistances of the respective portions of the element 118 serve as the arms of the bridge circuit 142. Each of the transistors 128 and 130 is of the depletion N-channel, field-effect type transistor wherein the resistance between the respective source and drain terminals is dependent upon the magnitude of the voltage at the gate terminals. Thereby, any variation in the resistance of the arm of the bridge circuit 142, as may occur through aging, or heating, or by a variation in the position of the sensor 52 relative to the mean value of the scanning beam, can be compensated by adjusting the voltages at the respective gate terminals, labeled #1 and #2. The correction signal on line 114 is a substantially constant or slowly varying analog voltage and is applied directly to gate #1, only a fraction of the integrated signal being coupled to the gate #2 or via the network of resistors 151-153 and the amplifier 156. The value of the resistor 152 is initially set in conjunction with a nominal value of the signal on line 114 to provide for values of resistance which substantially balance the bridge circuit 142.

Further adjustment of the balance of the circuit 142 is accomplished by virtue of the unequal coupling of the correction signal to the gate terminals of the transistors 128 and 130. As is depicted in the graph 164, appended adjacent the amplifier 156, an increase in the amplitude of the signal on line 114 results in an increase in the magnitude of the voltage applied to gate #1 and a decrease in the magnitude of the voltage applied to gate #2. The decreasing voltage at gate #2 results, in part, from the inverting function of the amplifier 156. Since the resistance values of the transistors 128 and 130 are dependent upon the values of the voltage at the respective gate terminals, it may be seen with reference to the graph 164 that, by an appropriate selection of the amplitude of the signal on line 114, a desired relationship between the resistance values of the transistors 128 and 130 may be established for counteracting any shift in the bridge parameters such as a shift in the position of the sensor 52 relative to the drum 22 in FIG. 1. In operation, therefore, and with the reference also to FIG. 4, a requisite frequency for the R.F. generator 46 is established by an iterated process wherein the frequency command word is continually updated by the counter 92 in response to signals of the interface unit 86 and, furthermore, wherein the circuitry of the interface unit 86 is adapted automatically to compensate for drifts due to component aging and due to shifting position of the sensor 52. The averaging unit 84 continually updates the average value of the frequency command words to sense whether any drifting has occurred. The resultant correction signal on line 114 is utilized to re-establish balance of the bridge circuit 142 so as to insure proper operation of the comparator 132 in transmitting its output signal along line 144 to the counter 92.

Any misalignment in the location of the sensor 52 would result in excessive unbalance in the bridge circuit 142 with a resultant signaling by the comparator 132 to drive the correction counter 92 to excessively high values of frequency command words on bus 54. Such words might be driven outside the range of storage capacity of the memory 90. However, the signal on line 114 maintains the bridge circuit 142 substantially balanced so as to insure that the command words on bus 54 remain within the range of the memory 90 and within the range of the counting capacity of the counter 92.

It should be noted that such a shifting in the values of all of the command words or all of the mirror facets 36 of FIG. 1 does not introduce an error in the spacing of the scan lines but, rather, introduces a fixed offset of all of the printed lines on the medium 24 from the bottom and top edges of the medium 24. For example, in the event that the sensor 52 were repositioned by a small amount, such as a tenth of a millimeter above or below the anticipated sight of the scan line, then the frequency controller 48 would command a new value of frequency which would alter the angle of deflection of the beam 62 so as to reposition the scan line in accordance with the position of the sensor 52. Thereby, the system 20 in FIG. 1 accomplishes the adaptive correction for errors in the orientation of the facets of the mirror 32.

While the foregoing system has been provided with features required for the adjustment of the location of a scan line to compensate for a misalignment in the facets of the rotating scanning mirror, it is to be understood that the system is generally applicable for the deflection of a beam of radiant energy in any situation wherein the position of the beam is to be sensed and adjusted.

Figure 7:
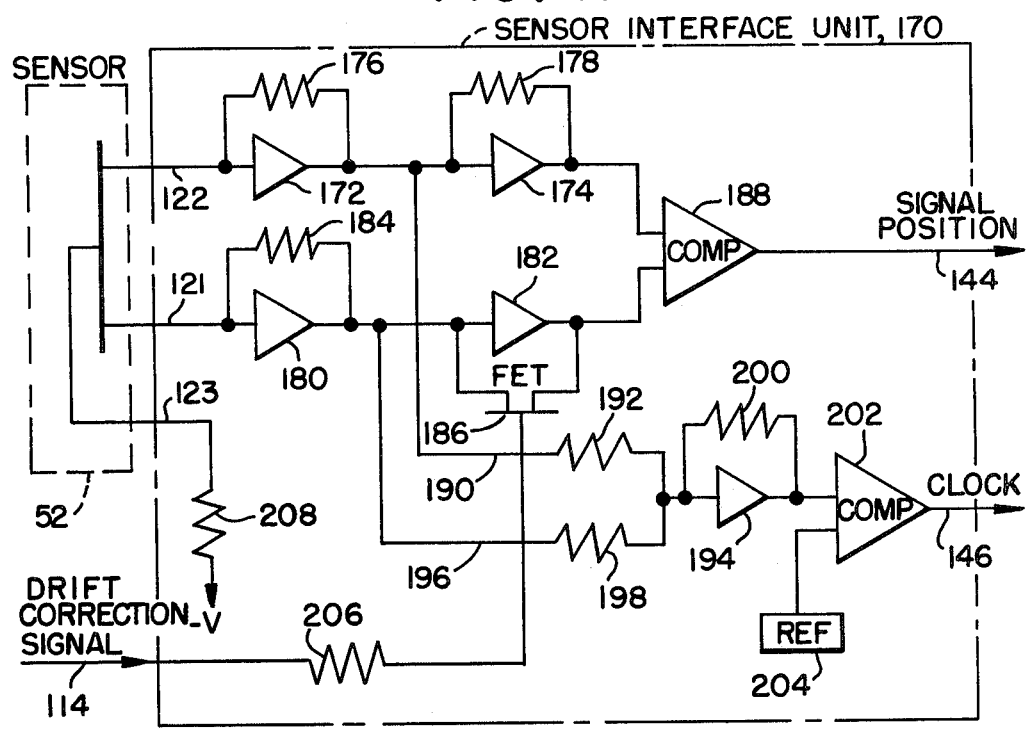
FIG. 7 is a schematic diagram of an alternative embodiment of the sensor interface.

Referring now to FIG. 7, there is shown a schematic diagram of a sensor interface unit 170 which is an alternative embodiment of the interface unit 86, shown in FIG. 6. The interface unit 170 precedes an input signal on line 114, as does the interface unit 86, and provides two output signals on line 144 and line 146 as does the interface unit 86. In addition, the three lines 121 and 122 and 123 are coupled to the sensor unit 52 appear with both the interface units 86 and 170. Thus, the interface units 170 may be substituted for the interface unit 86 for connection with the other components of the frequency controller 48, as shown in FIG. 4.

The interface unit 170 is of dual-channel construction, as is the bridge circuit of the interface unit 86 of FIG. 6. One channel of the interface unit 170 comprises amplifiers 172 and 174. Each of the amplifiers 172 and 174 are operational amplifiers and have feedback resistors, respectively, 176 and 178. Similarly, the other channel comprises operational amplifiers 180 and 182, there being a feedback resistor 184 connected between the input and output terminals of the amplifier 180 while the field effect transistor 186 serves as the feedback element of the amplifier 182. The output terminals of the amplifiers 174 and 182 are coupled to the input terminal of a comparator 188. The dual amplifiers 172 and 174 are serially connected between the line 122 and the comparator 188, the junction of the two amplifiers 172 and 174 being coupled by a line 190 and a summing resistor 192 to an input terminal of an operational amplifier 194. The two amplifiers 180 and 182 are serially connected between the line 121 and the comparator 188, the junction of the two amplifiers 180 and 182 being coupled by a line 196 and a summing resistor 198 to the input terminal of the amplifier 194. The operational amplifier 194 is provided with a feedback resistor 200 and is also connected to one input terminal of a comparator 202. The comparator 202 compares the magnitude of the output signal of the amplifier 194 with a reference signal provided by the reference source 204. The drift correction signal on line 114 is coupled by a resistor 206 to the gate terminal of the transistor 186. The electric power for energizing the sensor 52 is provided from a source of voltage (−V) coupled to the sensor 52 via a resistor 208 and the line 123.

In operation, the serial connection of the amplifiers 172 and 174 provides a voltage at one input terminal of the comparator 188 while the serial connection of the amplifier 180 and 182 provides a second voltage at the second input terminal of the comparator 188. The two voltages at the input terminal of the comparator 188 may be of equal amplitude in the event that the laser beam of FIGS. 1 and 2 strikes the central portion of the sensor 52 during a scanning by the beams. Alternatively, the voltages at the input terminals of the comparator 188 will differ in the event that the laser beam impinges upon the sensor 52 at a point which is of unequal distance between the sensor terminals coupled to the lines 121 and 122. Thereby, the comparator 188 provides a signal on line 144 which may be either of two logic states, mainly, a logic 1 or a logic 0 depending on whether the site of impingement of the laser beam dependent on the relative magnitude of the sum signal and the reference signal.

In the event that there is drifting in the electrical parameters of the sensor 52 or in the circuitry coupled thereto, or in the event that there is a mechanical shift in the position of the sensor 52 relative to the rest of the optical system of FIG. 1, then the signal on line 144 will be subject to an error due to the foregoing drift. The drift connection signal on line 144 corrects for the foregoing drift error as follows. The resistance of the transistor 186 is varied by a variation in the amplitude of the signal 114, which signal is applied to the gate terminal of the transistor 186. A change in the resistance results in the gain of the amplifier 182 and the consequent shift in the balance point between the two channels of the interface units 170. By shifting the balance point, the parameters of the circuit are thereby altered to compensate for the error associated in the foregoing drift, the error thereby being corrected. Thus, it is seen that the interface unit 170 provides the same function as does the interface unit 86 of FIG. 6.

Returning to FIG. 4, it is noted that, by way of alternative embodiment, the electronic unit 83 comprising the averaging unit 84 and the sensor interface unit 86 or 170 may be conveniently fabricated by the use of a microprocessor circuit configuration in the form of a micro-circuit on a chip. Such a microprocessor would then be suitably programmed to perform the functions of the averaging unit 84 and the interface unit 86 or 170. Such a microprocessor would provide the requisite signals on the lines 144 and 146 for operations of the correction counter 92 to update the parameters stored in the memory 90 as was disclosed previously with reference to FIG. 4. In addition, the microprocessor would be responsive to the difference between the sensor signals on the lines 121 and 122 for responding to the position of impingement of the laser beam upon the sensor 52.

Figure 8:
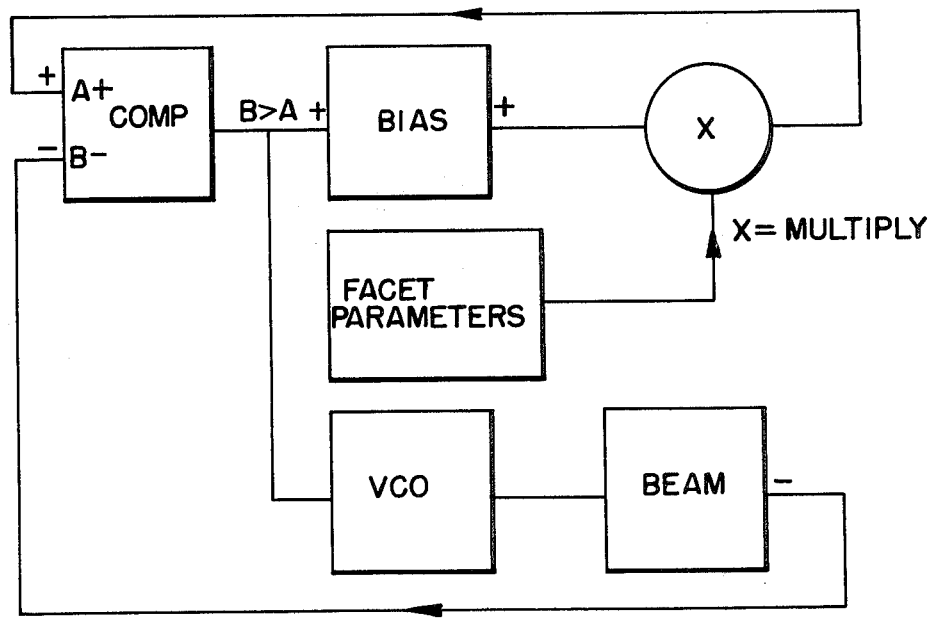

In the use of the miroprocessor, all of the facets of the scanning unit 32 are provided with a desired count representing the requisite center frequency for the modulator 28 of FIG. 1, the desired count being stored in the memory 90 as has been disclosed previously with reference to the system 20. The operation of the microprocessor is accomplished by the use of an algorithm and a program for carrying forth the algorithm. A simplified bock diagram of the facet correction algorithm is shown in FIG. 8 with a computer simulation thereof being shown in FIG. 9.

The algorithm is explained as follows. The comparator compares two analog Levels A and B giving a true digital output when B≧A. The A input is an analog representation of the facet perpendicularity error. The B input is an analog representation of the beam position wherein the higher the beam, the higher the voltage B. There are two loops that tend to change the analog levels at A and B. If B≧A is true, the beam is too high and the beam tends to be lowered. This lowering, however, is delayed one revolution before being effective on the beam. If there is a voltage at A which represents desired beam height, then the B loop would tend to bring the beam from all facets to the same point.

The voltage at A could be supplied by a potentiometer, and experimentally works over a short time periods. However, due to actual conditions, there is a tendency for the "fixed" height of the beam to drift up and down. This drift is not sufficient so as to deteriorate printing, however, it does present a risk that the beam level can drift so far that the extreme facets reach the correction limit of the design. If this happened, the correction loop would be saturated resulting in only partial correction. This is where the bias comes into play which, in effect, multiplies the facet parameters (high/low crossover points) by a "constant" so that the A input is always held at a level which does not allow the B loop to saturate.

The A (bias) loop consists of a slow integrator, one whose output increases at a constant rate with high input and decreases at the same rate when the input is low. The integrator input is derived from the sign bit of a common register which is incremented or decremented by 1 at each facet time at the same time one of its individual facet registers is updated. Whenever this common register sign bit changes, the integrator reverses. In actual practice, the total integrator output variation is generally less than 100 MV during operation.

Referring again to FIG. 8, it can be seen that whenever (B≧A) is true, the A loop tends to increase A and the B loop tends to decrease B. This tends to invert (B≧A) creating a condition that continuously recycles and is always self-correcting. At power turn on, however, the A loop is in saturation with (B≧A) true and remains so for any condition of B. To purge this saturation condition, a start-up mode is built into the microprocessor which does six things:

(1) Starts its bias integrator with a negative slope (since general clear drove it into position saturation).
(2) Fixes the VCO at a midrange frequency.
(3) Counts (B≧A) compares per revolution.
(4) Loads all facet registers with the desired central frequency parameter.
(5) Clears the common register to 0.
(6) Exits to the operating loop when the number of compares per revolution reach 7 or 8.

This control loop has been simulated on a programmable calculator, ignoring loop saturation, with the following results. Good resolution was achieved provided the integrator rate was slow enough. The steady state average frequency was equal to the frequency at start as demonstrated with two sets of random numbers used as facet parameters. Set number II was generated by adding a constant to set number I which was, in turn, generated by a normal distribution random number generator contained in a canned calculator program. Sets I and II both reached the same steady state regardless of starting bias voltage.

The foregoing algorithm has been implemented with an Intel 8748 microprocessor chip which contains all the facet registers, the common register, and the history record of the correction made during the previous eight revolutions. A description of this chip and its operating instructions are found in the booklet entitled, "Intel MCS-48 User's Manual", April 1979, published by Intel Corporation, Santa Clara, California, which is expressly incorporated herein it its entirety by reference. An "Instruction Set" is found on pp. 4-1 through 4-5 of the reference document. The computer program listings are presented below.

The foregoing has described an apparatus for correcting facet errors in mirror scanning systems.

It is anticipated that aspects of the present invention, other than those specifically defined in the appended claims, can be obtained from the foregoing description and the drawings.

```
ASM48 FECS PAGEWIDTH(78) PAGELENGTH(60) TITLE('FACET ERROR CORRECTION')

ISIS-II MCS-48/UPI-41 MACRO ASSEMBLER, V2.0
FACET ERROR CORRECTION

LOC   OBJ          SEQ           SOURCE STATEMENT

1   ;****************************************************
                        2   ;*         FACET ERROR CORRECTION SOFTWARE           *
                        3   ;****************************************************
                        4   ;                             ;NOVEMBER 6, 1981 0825 EST
                        5                                 ;ADD DOUBLE PRECISION COUNTER
                        6                                 ;FEATURING CONTINUOUS POLL
                        7                                 ;RANGE INDICATOR
                        8                                 ;RESTART AFTER TIMEOUT
                        9                                 ;GROUND "INT" TO FORCE 80 MHZ
                       10                                 ;AT RESET
    0000  0A           11   RESET:  IN      A,P2
    0001  B205         12           JB5     DIG
    0003  2479         13           JMP     DISREG
    0005  1605         14   DIG:    JTF     $
    0007  99F1         15           ANL     P1,#0F1H;       SET 80 MHZ
    0009  040C         16           JMP     START
    000C               17           ORG     12
                       18   ;****************************************************
                       19   ;*                            ;START INTEGRATOR MOVING   *
                       20   ;****************************************************
```

ISIS-II MCS-48/UPI-41 MACRO ASSEMBLER, V2.0
FACET ERROR CORRECTION

```
LOC   OBJ      SEQ           SOURCE STATEMENT
000C  35        21 START:  DIS    TCNTI     ;DISABLE TIMER INT
000D  B83E      22         MOV    R0,#62
000F  27        23         CLR    A
0010  A0        24 S1:     MOV    @R0,A
0011  E810      25         DJNZ   R0,S1
0013  BF10      26         MOV    R7,#16    ;HANG AFTER THIS MANY RESTARTS
0015  65        27 S2:     STOP   TCNT
0016  27        28         CLR    A
0017  62        29         MOV    T,A
0018  8A10      30         ORL    P2,#16
001A  161A      31         JTF    $
001C  BA0F      32         MOV    R2,#15
001E  B820      33         MOV    R0,#32
0020  B033      34 STC:    MOV    @R0,#33H             ;FREQUENCY PARAMETER
0022  00        35         NOP
0023  00        36         NOP
0024  18        37         INC    R0
0025  EA20      38         DJNZ   R2,STC
0027  2363      39         MOV    A,#063H
0029  EF2F      40         DJNZ   R7,T0
002B  8A04      41         ORL    P2,#4
002D  042D      42         JMP    $         ;HANG (P22 HIGH)
002F  362F      43 T0:     JT0    $
0031  2631      44         JNT0   $
0033  4637      45         JNT1   L0
0035  533F      46         ANL    A,#3FH
0037  39        47 L0:     OUTL   P1,A
0038  9AF8      48         ANL    P2,#0F8H
                49 ;***************************************************
                50 ;*                                                 *
                51 ;*           START MODE                            *
                52 ;*     WAIT FOR UPS AND DOWNS TO BALANCE OUT       *
                53 ;*                                                 *
                54 ;***************************************************
003A  BD08      55 CLR1:   MOV    R5,#8     ;START MODE
003C  BC08      56         MOV    R4,#8
003E  BA0F      57         MOV    R2,#15
0040  8640      58 LP1:    JNI    $
0042  23E1      59         MOV    A,#0E1H   ;DISPLAY 'E1'
0044  02        60         OUTL   BUS,A
0045  8649      61         JNI    $+4
0047  0445      62         JMP    $-2
0049  23E2      63         MOV    A,#0E2H
004B  02        64         OUTL   BUS,A     ;DISPLAY 'E2'
004C  364C      65 LP2:    JT0    $
004E  264E      66         JNT0   $
0050  4655      67         JNT1   L01       ;INVERT BY CHANGING TO '56XX'
0052  CC        68         DEC    R4
0053  0456      69         JMP    $+3
0055  CD        70 L01:    DEC    R5
0056  EA40      71         DJNZ   R2,LP1
0058  FC        72         MOV    A,R4      ;TEST FOR >8
0059  F260      73         JB7    HI
005B  FD        74         MOV    A,R5
005C  F269      75         JB7    LOWE
005E  046D      76         JMP    CLR6      ;JUMP TO OPER MODE
0060  27        77 HI:     CLR    A
0061  37        78         CPL    A
0062  AE        79         MOV    R6,A
0063  3467      80         CALL   PORT1
0065  27        81         CLR    A
0066  AE        82         MOV    R6,A
0067  043A      83         JMP    CLR1      ;STAY IN START MODE
0069  2300      84 LOWE:   MOV    A,#0
006B  0462      85         JMP    HI+2
```

ISIS-II MCS-48/UPI-41 MACRO ASSEMBLER, V2.0
FACET ERROR CORRECTION

```
LOC   OBJ         SEQ              SOURCE STATEMENT
                  86    ;***********************************************
                  87    ;*                 ;OPERATING MODE              *
                  88    ;*                                              *
                  89    ;*       ;ADJUST FREQ UP OR DOWN EACH FACET TIME *
                  90    ;*                                              *
                  91    ;***********************************************
006D BD00         92  CLR6:   MOV    R5,#0
006F BE00         93          MOV    R6,#0       ;CLEAR R6
0071 BC01         94          MOV    R4,#1
0073 BB01         95          MOV    R3,#1
0075 9AE8         96          ANL    P2,#0E8H
0077 BA0F         97  FRACLR: MOV    R2,#15      ;RESET INDEX REGISTERS
0079 B820         98          MOV    R0,#32
007B B930         99          MOV    R1,#48
007D 55           100 POLL:   STRT   T
007E 9AF7         101         ANL    P2,#0F7H            ;MARKER
0080 8686         102         JNI    $+6
0082 1694         103         JTF    TIME
0084 0480         104         JMP    $-4
0086 27           105         CLR    A
0087 62           106         MOV    T,A
0088 0496         107         JMP    LOOP1       ;READ SIX BITS TO VCO
008A 8690         108 TT0:    JNI    TTF
008C 27           109         CLR    A
008D 62           110         MOV    T,A
008E 049D         111         JMP    LOOP2       ;CALC UP & DOWN
                  112
0090 1694         113 TTF:    JTF    TIME
0092 048A         114         JMP    TT0
0094 0415         115 TIME:   JMP    S2
                  116 ;***    WAIT FOR END OF SWEEP  ******************
0096 F0           117 LOOP1:  MOV    A,@R0
0097 3473         118         CALL   PORT6
0099 8A08         119         ORL    P2,#8       ;MARKER GOES HIGH
009B 048A         120         JMP    TT0
                  121 ;***    WAIT FOR START OF SWEEP ******************
009D 56A3         122 LOOP2:  JT1    NEG         ;INVERT BY CHANGING TO '46--'
009F 3400         123         CALL   UP
00A1 04A5         124         JMP    $+4
00A3 3432         125 NEG:    CALL   DOWN
00A5 3467         126         CALL   PORT1               ;OPTIONAL
00A7 18           127         INC    R0
00A8 19           128         INC    R1
00A9 EA7D         129         DJNZ   R2,POLL
00AB EBB0         130         DJNZ   R3,$+5
00AD 9AFE         131         ANL    P2,#0FEH
00AF 1B           132         INC    R3
00B0 ECB5         133         DJNZ   R4,DSPLY
00B2 9AFD         134         ANL    P2,#0FDH
00B4 1C           135         INC    R4
00B5 D5           136 DSPLY:  SEL    RB1
00B6 EEBF         137         DJNZ   R6,BDSP
00B8 BE1E         138         MOV    R6,#30
00BA FC           139         MOV    A,R4
00BB 37           140         CPL    A
00BC 17           141         INC    A
00BD 6B           142         ADD    A,R3
00BE AD           143         MOV    R5,A
00BF 0A           144 BDSP:   IN     A,P2
00C0 F2C6         145         JB7    DSP,        GND P27 TO FORCE RANGE DISPLAY
00C2 FD           146         MOV    A,R5
00C3 02           147         OUTL   BUS,A
00C4 04CA         148         JMP    EDSP
00C6 08           149 DSP:    INS    A,BUS
00C7 A9           150         MOV    R1,A
00C8 F1           151         MOV    A,@R1
00C9 02           152         OUTL   BUS,A
00CA 1C           153 EDSP:   INC    R4
00CB CB           154         DEC    R3
```

ISIS-II MCS-48/UPI-41 MAC ASSEMBLER, V2.0
FACET ERROR CORRECTION

```
LOC   OBJ         SEQ           SOURCE STATEMENT
00CC  C5          155           SEL     RB0
00CD  0477        156           JMP     FRACLR
                  157  ;*******************************************
                  158  ;*         ;COUNT UP SUBROUTINE            *
                  159  ;*******************************************
                  160
0100              161           ORG     256
0100  10          162  UP:      INC     @R0
0101  233F        163           MOV     A,#3FH
                  164                   ;MUST BE ONE MORE THAN # IN "FIXUP"
0103  3463        165           CALL    SUB
0105  70          166           ADDC    A,@R0
0106  E60A        167           JNC     $+4
0108  241A        168           JMP     FIXUP
010A  1D          169           INC     R5
010B  FD          170           MOV     A,R5
010C  960F        171           JNZ     $+3
010E  1E          172           INC     R6
010F  F0          173  MAX:     MOV     A,@R0
0110  D5          174           SEL     RB1
0111  AA          175           MOV     R2,A
0112  37          176           CPL     A
0113  6B          177           ADD     A,R3
0114  F618        178           JC      $+4
0116  FA          179           MOV     A,R2
0117  AB          180           MOV     R3,A
0118  C5          181           SEL     RB0
0119  83          182           RET
011A  B03E        183  FIXUP:   MOV     @R0,#3EH  ;LOWER FREQ LIMIT DETECTOR
011C  1B          184           INC     R3
011D  FB          185           MOV     A,R3
011E  F222        186           JB7     HIERR
0120  240F        187           JMP     MAX
0122  8A01        188  HIERR:   ORL     P2,#1
0124  D3FF        189           XRL     A,#0FFH
0126  962E        190           JNZ     ERREX
0128  0A          191           IN      A,P2
0129  D22F        192           JB6     AS2
                  193  ;GND P26 TO INHIBIT RESTARTS ON LIMIT
012B  CB          194           DEC     R3
012C  242E        195           JMP     ERREX
012E  93          196  ERREX:   RETR
012F  C5          197  AS2:     SEL     RB0
0130  0415        198           JMP     S2
                  199  ;*******************************************
                  200  ;*         ;COUNT DOWN SUBROUTINE          *
                  201  ;*******************************************
0132  F0          202  DOWN:    MOV     A,@R0
0133  07          203           DEC     A
0134  A0          204           MOV     @R0,A
0135  2327        205           MOV     A,#27H    ;MUST BE SAME AS # IN "FIXDN"
0137  3463        206           CALL    SUB
0139  70          207           ADDC    A,@R0
013A  F63E        208           JC      $+4
013C  244F        209           JMP     FIXDN
013E  CD          210           DEC     R5
013F  FD          211           MOV     A,R5
0140  37          212           CPL     A
0141  9644        213           JNZ     $+3
0143  CE          214           DEC     R6
0144  F0          215  MIN:     MOV     A,@R0
0145  D5          216           SEL     RB1
0146  AA          217           MOV     R2,A
0147  37          218           CPL     A
0148  6C          219           ADD     A,R4
0149  E64D        220           JNC     $+4
014B  FA          221           MOV     A,R2
014C  AC          222           MOV     R4,A
014D  C5          223           SEL     RB0
```

ISIS-II MCS-48/UPI-41 MACRO ASSEMBLER, V2.0
FACET ERROR CORRECTION

```
LOC   OBJ        SEQ           SOURCE STATEMENT
014E  83         224           RET
014F  B027       225  FIXDN:   MOV    @R0,#27H    ;UPPER FREQ LIMIT DETECTOR
0151  1C         226           INC    R4
0152  FC         227           MOV    A,R4
0153  F257       228           JB7    LOERR
0155  2444       229           JMP    MIN
0157  8A02       230  LOERR:   ORL    P2,#2
0159  D3FF       231           XRL    A,#0FFH
015B  962E       232           JNZ    ERREX
015D  0A         233           IN     A,P2
015E  D22F       234           JB6    AS2
0160  CC         235           DEC    R4
0161  242E       236           JMP    ERREX
                 237  ;************************************************
                 238  ;*              SUBTRACT SUBROUTINE              *
                 239  ;************************************************
                 240
0163  37         241  SUB:     CPL    A
0164  17         242           INC    A
0165  97         243           CLR    C
0166  83         244           RET
                 245  ;***  OUTPUT BIT TO INTEGRATOR  *******************
0167  09         246  PORT1:   IN     A,P1
0168  FE         247           MOV    A,R6
0169  00         248           NOP                ;37= INVERT INT OUTPUT BIT
016A  F270       249           JB7    MINUS
016C  993F       250           ANL    P1,#3FH
016E  2472       251           JMP    $+4
0170  8980       252  MINUS:   ORL    P1,#80H
0172  93         253           RETR
                 254  ;***  OUTPUT BYTE TO PLL     *******************
0173  09         255  PORT6:   IN     A,P1
0174  5380       256           ANL    A,#80H
0176  40         257           ORL    A,@R0
0177  39         258           OUTL   P1,A
0178  93         259           RETR
0179  08         260  DISREG:  INS    A,BUS
017A  A9         261           MOV    R1,A
017B  F1         262           MOV    A,@R1
017C  02         263           OUTL   BUS,A
017D  2479       264           JMP    DISREG
                 265
                 266           ;DATE OF LAST REVISION AFFECTING OBJECT CODE
0200             267           ORG    200H
0200  11         268  MONTH:   DB     11H
0201  06         269  DATE:    DB     6
0202  81         270  YEAR:    DB     81H
0203  0825       271  TIMED:   DW     0825H
                 272           END
```

```
USER SYMBOLS
AS2    012F   BDSP   00BF   CLR1   003A   CLR6   006D   DATE   0201
DIG    0005   DISREG 0179   DOWN   0132   DSP    00C6   DSPLY  0065
EDSP   00CA   ERREX  012E   FIXDN  014F   FIXUP  011A   FRACLR 0077
HI     0060   HIERR  0122   LO     0037   LO1    0055   LOERR  0157
LOOP1  0096   LOOP2  009D   LOWE   0069   LP1    0040   LP2    004C
MAX    010F   MIN    0144   MINUS  0170   MONTH  0200   NEG    00A3
FOLL   007D   PORT1  0167   PORT6  0173   RESET  0000   S1     0010
S2     0015   START  000C   STC    0020   SUB    0163   T0     002F
TIME   0094   TIMED  0203   TT0    008A   TTF    0090   UP     0100
YEAR   0202
```

ASSEMBLY COMPLETE, NO ERRORS

Having thus described the invention, what is claimed is:

1. An apparatus for correcting facet errors in mirror scanning systems, comprising:

means for scanning a beam in a plane, said scanning means including a rotatable assembly of optical elements;

means for modulating said beam with data and deflecting said beam as a function of the frequency of an acoustic signal which drives said modulating means;

a sensor of the position of said beam as directed by said rotatable assembly, said rotatable assembly being connected in position relative to said modulator for intercepting said beam deflected by said modulating means; and means connected to be responsive to signals of said sensor for controlling said frequency, said controlling means comprising a memory for storing values of said frequency for scans by successive ones of said optical elements, and means responsive to signals of said sensor for altering the values of said frequency stored in said memory upon the occurrences of successive ones of said scans for optimizing the values of said frequency for scans by respective ones of said optical elements, said altering means comprises a counter and means for substituting a count for a value of said frequency stored in said memory.

2. A system according to claim 1 wherein said counter is an up/down counter, the direction of said counting being controlled by a signal generated in response to the location of impingement of a beam of light upon said sensor.

3. A system according to claim 2 wherein said altering means further comprises interfacing means coupled between said sensor and said counter, said interfacing means generating the control signal for controlling the direction of the counting of said counter in response to the location of the point of impingement of a beam of light upon said sensor.

4. A system according to claim 3 wherein said frequency control means further comprises means for establishing an average value of the values of frequency stored in said memory, said interfacing means including a bridge circuit incorporating said sensor, and wherein said interface means further comprises means responsive to the average value of said averaging unit for adjusting component values of said bridge circuit to compensate for drift.

5. An apparatus for correcting facet errors in mirror scanning systems, comprising:

means for scanning a beam in a plane, said scanning means including a rotatable assembly of optical elements;

means for modulating said beam with data and deflecting said beam as a function of the frequency of an acoustic signal which drives said modulating means;

a sensor of the position of said beam as directed by said rotatable assembly, said rotatable assembly being connected in position relative to said modulator for intercepting said beam deflected by said modulating means; and means connected to be responsive to signals of said sensor for controlling said frequency, said controlling means comprising a memory for storing values of said frequency for scans by successive ones of said optical elements, and means responsive to signals of said sensor for altering the values of said frequency stored in said memory upon the occurrence of successive ones of said scans for optimizing the values of said frequency for scans by respective ones of said optical elements, said frequency control means further comprises means for averaging the values of frequency stored in said memory for the use of respective ones of said optical elements, said frequency control means further comprising interfacing means coupled between said sensor and said counter, and wherein said interfacing means includes means responsive to the average value of said averaging unit for altering component values of circuitry within said interfacing unit to compensate for drift.

6. A system according to claim 5 wherein said counter is directed to count up or down in accordance with a signal provided by said interfacing unit in correspondence with the location of a point of impingement of a beam of light upon said sensor, the count of said counter being substituted in said memory in place of a previous value of said frequency.

7. An apparatus for correcting facet errors in mirror scanning systems, comprising:

means for scanning a beam in a plane, said means including a rotatable assembly of optical elements;

modulating means positioned relative to said rotatable assembly for directing said beam transmitted by said modulating means to said rotatable assembly, said modulating means modulating said beam with data and deflecting said beam as a function of the frequency of an acoustic signal which drives said modulator;

means for sensing the position of said beam as directed by said rotatable assembly; and means for controlling said frequency, said controlling means including means for developing signals designating the position of said beam, said signal developing means including a bridge circuit and means responsive to the bridge signals of said bridge circuit for generating a value of said frequency, said controlling means further comprising means for averaging the values of frequency utilized in conjunction with respective ones of said optical elements, and means coupled to said averaging means for altering the balance of said bridge circuit to compensate for drift in component parameters of said bridge circuit.

8. A system according to claim 7 wherein said averaging means includes means for generating a pulse-width modulated signal having a duty cycle commensurate with the average value.

9. A system according to claim 8 wherein said altering means comprises means responsive to said pulse-width modulated signal of said averaging means for integrating said pulse-width modulated signal to provide a substantially constant analog signal for control of said component parameters in said bridge circuit.

10. A system according to claim 9 wherein said bridge circuit includes field-effect transistors as arms of said bridge circuit, and means for coupling said substantially constant analog signal to gate terminals of said transistors.

11. A system according to claim 10 wherein said coupling means to said transistors include a divider circuit for apportioning said analog signal among individual ones of said transistors.

12. A system according to claim 7 wherein said generating means includes a counter, means for presetting said counter with a value of said frequency, and means for incrementing said value by a positive or negative count to optimize the frequency.

13. A system according to claim 12 wherein said generating means comprises a memory and means presettable with a value of said frequency stored in said memory for altering the value of a frequency stored in said memory.

14. A system according to claim 13 wherein said frequency control means further comprises comparator means coupled between said sensor and said frequency altering means to direct said frequency altering means to increment or decrement the value of said frequency.

15. A beam deflection system comprising means responsive to the frequency of a drive signal for deflecting a beam of radiant energy, means for sensing the position of said beam, means for storing a value of said frequency, means coupled to said storing means for altering said value in accordance with a position of said beam as sensed by said sensing means, and means for altering said value in accordance with a position of said beam as sensed by said sensing means, and means coupled between said storing means and said deflecting means for generating said drive signal, said altering means includes a counter presettable with a value of said frequency extracted from said storing means, said system further comprising means coupled to said sensing means for directing said counter to increment or decrement its count to establish a new value of said frequency.

16. A system according to claim 15 wherein said directing means includes a comparator and a bridge circuit incorporating said sensing means, said comparator being coupled across said bridge circuit for generating a signal to direct the counting of said counter.

17. A beam deflection system comprising means responsive to the frequency of a drive signal for deflecting a beam of radiant energy, means for sensing the position of said beam, said sensing means including a circuit for developing electric signals designating said position; means responsive to said signals of said sensing means for altering the value of said frequency; means coupled to said altering means for generating a signal proportional to the average of a succession of frequency values; and means coupled between said generating means and the circuit of said sensing means for altering component parameters of said circuit in response to the signal of said generating means to compensate for drift in said component parameters.

18. A system according to claim 7 wherein said altering means includes a memory for storing values of said frequency and counting means presettable to a value of frequency stored in said memory, a direction of said counting means being responsive to a signal generated by said circuit of said sensing means to alter the value of a count in accordance with the position of said beam.

19. A system according to claim 18 wherein said altering means further comprises means substituting a count of said counting means for the value of a frequency stored in said memory.

* * * * *

UNITED STATES PATENT AND TRADEMARK OFFICE
CERTIFICATE OF CORRECTION

PATENT NO. : 4,441,126

DATED : April 3, 1984

INVENTOR(S) : Nelson L. Greenig et al

It is certified that error appears in the above-identified patent and that said Letters Patent is hereby corrected as shown below:

Column 24, line 20, "7" should read -- 17 --.

Signed and Sealed this

Twelfth Day of November 1985

[SEAL]

Attest:

DONALD J. QUIGG

Attesting Officer

Commissioner of Patents and Trademarks